(12) United States Patent
Shikama et al.

(10) Patent No.: US 7,607,039 B2
(45) Date of Patent: Oct. 20, 2009

(54) DATA STORAGE DEVICE WITH RE-ALLOCATION PROCESSING WHICH DETERMINES AN ORDER IN WHICH RE-ALLOCATION PROCESSING IS EXECUTED FOR DEFECTIVE SECTORS

(75) Inventors: Takeshi Shikama, Kanagawa-ken (JP); Eiji Hagi, Kanagawa-ken (JP); Mutsuya Hida, Kanagawa-ken (JP); Hisatoshi Iwata, Kanagawa-ken (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 543 days.

(21) Appl. No.: 11/388,948

(22) Filed: Mar. 24, 2006

(65) Prior Publication Data

US 2006/0218211 A1    Sep. 28, 2006

(30) Foreign Application Priority Data

Mar. 25, 2005  (JP)  .............................. 2005-089407

(51) Int. Cl.
G06F 11/00    (2006.01)
(52) U.S. Cl. .......................................... 714/8; 714/723
(58) Field of Classification Search ...................... 714/8
See application file for complete search history.

(56) References Cited

U.S. PATENT DOCUMENTS 6,490,691 B1 * 12/2002 Kimura et al. .................. 714/8
6,754,018 B2   6/2004 Takahashi
6,996,740 B2 *  2/2006 Ro ................................. 714/5
7,143,309 B2 * 11/2006 Yoshida ......................... 714/8
2004/0153743 A1 *  8/2004 Bolt et al. ...................... 714/7
2007/0094534 A1 *  4/2007 Andreev et al. ................ 714/8

FOREIGN PATENT DOCUMENTS

JP       11-185210       7/1999

\* cited by examiner

*Primary Examiner*—Gabriel L Chu
(74) *Attorney, Agent, or Firm*—Townsend and Townsend and Crew LLP; Patrick Duncan (57) ABSTRACT

Embodiments of the invention improve the security of data written on a magnetic disk by performing re-allocation processing starting from a sector whose defect is large in automatic re-allocation processing. According to one embodiment of the present invention, after the reliability of each of data sectors that have been read out from a magnetic disk according to a read command is determined, re-allocation processing on the data sectors is performed in the order of increasing reliability. As a result, within a limited period of time, it is possible to replace by priority a data sector where there is a high possibility that data recovery will be unable to be achieved. This makes it possible to increase the security of data and the reliability of the HDD. The reliability of each data sector is determined on the basis of the number of bytes corrected by ECC.

19 Claims, 7 Drawing Sheets

Data-read-out order

Fig. 3

(b) The re-allocation order →

| Automatic re-allocation sector No. | 108 | 110 | 101 | 107 | 102 | 109 | 104 |
|---|---|---|---|---|---|---|---|

(a)

| Data sector No | The number of corrected bytes | The re-allocation order |
|---|---|---|
| 101 | 4 | 3 |
| 102 | 2 | 5 |
| 103 | 0 | / |
| 104 | 1 | 7 |
| 105 | 0 | / |
| 106 | 0 | / |
| 107 | 3 | 4 |
| 108 | 12 | 1 |
| 109 | 2 | 6 |
| 110 | 10 | 2 |

DATA STORAGE DEVICE WITH RE-ALLOCATION PROCESSING WHICH DETERMINES AN ORDER IN WHICH RE-ALLOCATION PROCESSING IS EXECUTED FOR DEFECTIVE SECTORS

CROSS-REFERENCES TO RELATED APPLICATIONS

This application claims priority from Japanese Patent Application No. JP2005-089407, filed Mar. 25, 2005, the entire disclosure of which is incorporated herein by reference.

BACKGROUND OF THE INVENTION

The present invention relates to data storage devices, and more particularly to execution order control for re-allocation processing of replacing a plurality of defective sectors in the data storage devices.

Devices using various types of media, such as optical disks, magnetic tapes, and semiconductor memories, are known as data storage devices. Among them, hard disk drives (hereinafter referred to as "HDDs") have become popular as storage devices for computers to such an extent that they are one type of the storage devices indispensable for today's computer systems. Further, not limited to computers, their application is widening more and more due to the superior characteristics with the advent of moving picture recording/reproducing devices, car navigation systems, removable memories for digital cameras and so on.

A magnetic disk used in an HDD has a plurality of tracks that are concentrically formed. Each track is partitioned into a plurality of sectors (servo sectors). Servo data and user data are written to each servo sector. Here, the user data written to each servo sector ranges over a plurality of sectors (data sectors). A head element moves according to servo data. As a result, data can be written or read at a desired address. A signal read out from a magnetic disk by the head element through data read processing is subjected to waveform shaping, decoding processing and other prescribed signal processing by a signal processing circuit before the signal is transmitted to a host. Data transmitted from the host is also subjected to prescribed processing by the signal processing circuit in like manner before the data is written to the magnetic disk by the head element.

If a data sector includes a defect, there is a possibility that user data written to the data sector will be lost. Therefore, the defective sector is replaced with another sector. To be more specific, if a specific data sector is judged to be a defective sector, data of the sector in question is rewritten to an alternate area on a magnetic disk. The alternate area includes a plurality of reserved sectors, each of which stores user data in place of a user sector having a defect. Here, one defective sector is reassigned to one reserved sector. See, e.g., patent document 1 (Japanese Patent Laid-open No. 11-185210).

As one method for defective-sector re-allocation processing, automatic re-allocation processing executed in an execution sequence of a read command is known in the art. An HDD receives a read command from a host, and then reads out data from data sectors within a range specified by the read command. At this time, if a data sector that has been read out is a defective sector, the HDD executes re-allocation processing on the defective sector.

To be more specific, the HDD acquires from the host a read command whose data range covers a plurality of data sectors. Upon reading out data from the first data sector, the HDD judges whether or not the data sector in question is a defective sector. If it is judged that the data sector in question is not a defective sector, the HDD reads out data from the next data sector. If it is judged that the data sector in question is a defective sector, the HDD executes re-allocation processing of the data sector, and then starts reading of the next data sector. By repeating this processing, reserved sectors are assigned before a specific data sector enters a state in which it is unable to be recovered. This makes it possible to improve the reliability of written data.

However, the HDD needs to complete the read command within a specified period of time (timeout period). If the processing of the read command is not completed before the timeout period elapses, the host disconnects the HDD so as to read data from another HDD. This enables the host to prevent the performance of application transactions from decreasing.

Accordingly, the HDD must complete re-allocation processing of replacing defective sectors within a limited period of time before the timeout period elapses. Here, the re-allocation processing includes: accessing a reserved sector; writing data to the reserved sector; and making a check whether or not the data has been successfully written. Accordingly, a sufficient length of time is required to complete the re-allocation processing. Therefore, it is not always possible to complete the re-allocation processing for all defective sectors before the timeout period elapses.

BRIEF SUMMARY OF THE INVENTION

As described above, the conventional automatic re-allocation processing executes the defective-sector re-allocation processing according to the order in which data is read. For this reason, there is a case where the re-allocation processing cannot be performed on a defective sector whose read order is late. For example, on the assumptions that data is read out from ten data sectors, and that the first, second, and ninth data sectors are defective sectors, the HDD first reads out data from the first data sector, judges whether or not the first data sector is defective, and executes re-allocation processing on the first data sector. Then, the HDD reads out data from the second data sector, judges whether or not the second data sector is defective, and executes re-allocation processing on the second data sector in a similar manner. After that, the HDD successively reads data from the subsequent data sector, and judges whether or not the data sector in question is defective. However, when the remaining timeout period becomes short, the HDD reads out data from each data sector without judging whether or not the data sector in question is defective and without executing the re-allocation processing on the data sector in question if necessary. On completion of reading of all data sectors, the HDD transmits the data to the host. As a result, re-allocation processing is not executed on the ninth data sector.

What is important here is that the reliability of a defective sector is not uniform. In other words, a possibility that data recovery will be unable to be achieved differs on a defective sector basis. From the viewpoint of the security of data, it is desirable that the defective-sector re-allocation processing be executed by priority in the order of increasing reliability. However, as far as the conventional automatic re-allocation processing is concerned, the re-allocation processing is executed in the order in which data is read out. Therefore, there is a possibility that re-allocation processing will not be executed on, for example, a defective sector whose reliability is the lowest. In the above example, if the ninth data sector has a defect that is larger than those existing in the first and second data sectors, and accordingly, even if there is the highest possibility that data recovery will be unable to be achieved, the re-allocation processing is not executed on the ninth data sector.

The present invention has been made taking the situations as described above into consideration. A feature of the present invention is to improve the technique for determining the execution order of defective-sector re-allocation processing executed in data storage devices, and thereby to improve the security of data.

According to a first aspect of the present invention, there is provided a data storage device comprising: a read control part which performs control to receive a read command, and read out data from a plurality of sectors on a medium corresponding to the read command; a re-allocation-processing order determination part which determines the order in which re-allocation processing is executed for defective sectors included in the plurality of sectors whose data has been read out; and a re-allocation-processing control part which controls the re-allocation processing for the defective sectors on the basis of the re-allocation-processing order determined by the re-allocation-processing order determination part. By determining the re-allocation processing on the defective sectors included in the plurality of sectors whose data has been read out, it is possible to execute the re-allocation processing starting from a defective sector that should be executed by priority.

According to a second aspect of the present invention, in the first aspect, the re-allocation-processing order determination part determines the re-allocation-processing order on the basis of an amount of error correction achieved when data has been read out from each sector. This makes it possible to determine the reliability of the defective sectors easily and accurately.

According to a third aspect of the present invention, in the first aspect, the re-allocation-processing order determination part determines the re-allocation-processing order on the basis of retry processing performed when data has been read out from each sector. This makes it possible to accurately determine the reliability of the defective sectors.

According to a fourth aspect of the present invention, in the second aspect, the re-allocation-processing order determination part determines the re-allocation-processing order so that the re-allocation processing is executed in the order of the decreasing amount of error correction achieved when data has been read out from each sector. This makes it possible to execute the re-allocation processing exactly starting from a defective sector whose reliability is low.

According to a fifth aspect of the present invention, in the second aspect, the read control part reads out read data from all specified sectors on the medium, all the sectors being specified by the read command; and the re-allocation-processing order determination part determines the order in which the re-allocation processing is executed on defective sectors included in all the sectors. This makes it possible to reliably execute the re-allocation processing starting from a defective sector to which a higher priority is given within a specified range.

According to a sixth aspect of the present invention, in the second aspect, the read control part reads out read data from all corresponding sectors on the medium, all the sectors corresponding to the read command; and the re-allocation-processing order determination part determines the order in which the re-allocation processing is executed for defective sectors included in all the sectors.

In addition, according to a seventh aspect of the present invention, in the sixth aspect, data which should be read out from all the sectors on the medium corresponding to the read command includes data at positions before and/or after the sectors specified by the read command. This makes it possible to reliably execute the re-allocation processing for all read data including read forward and read back starting from a defective sector that should be executed by priority.

According to an eighth aspect of the present invention, in the first aspect, the end timing of the re-allocation processing for a plurality of defective sectors is determined so that a command completion notification of the read command is transmitted before a timeout period of the read command elapses. This makes it possible to prevent a timeout error from occurring in a host.

According to a ninth aspect of the present invention, in the eighth aspect, the end timing is determined by use of a predetermined value and the number of times the re-allocation processing on the defective sectors is executed. This makes it possible to determine the timing by simple and easy processing.

According to a tenth aspect of the present invention, in the first aspect, the re-allocation-processing order is such that the re-allocation processing is performed starting from a sector whose reliability is low. This makes it possible to execute by priority the re-allocation processing on a sector in which there is a high possibility that data recovery will be unable to be achieved, and thereby to increase the security of data.

According to an eleventh aspect of the present invention, in the first aspect, the data storage device further includes a correction processing part which performs error-correction processing on data read out from the medium, wherein the re-allocation-processing order determination part determines the re-allocation-processing order of defective sectors by use of the amount of correction made for each sector whose data has been read out. This makes it possible to accurately determine the reliability of the defective sectors.

According to a twelfth aspect of the present invention, in the eleventh aspect, the re-allocation-processing order determination part sets a sector having a largest amount of correction as the first in the re-allocation-processing order. This makes it possible to execute the re-allocation processing on a sector having the largest defect with first priority.

According to a thirteenth aspect of the present invention, in the first aspect, the read control part performs control to read out read data from all specified sectors on the medium, the all sectors being specified by the read command; and on the basis of the amount of error correction achieved when data has been read out from each sector, the re-allocation-processing order determination part determines the re-allocation-processing order of defective sectors included in all of sectors whose data has been read out. This makes it possible to reliably execute the re-allocation processing starting from a defective sector to which a higher priority is given within a specified range.

According to the present invention, it is possible to improve the security of data written on a medium.

DETAILED DESCRIPTION OF THE INVENTION

First Embodiment

Specific embodiments of the present invention will be described below. For clarification of the explanation, omission and simplification are made, where appropriate, in the following description and drawings. Identical reference numerals are used to designate identical elements that are common to the figures, and redundant description is omitted as appropriate for clarification of the explanation.

Specific embodiments to which the present invention is applied will be described in detail with reference to drawings. The embodiments relate to a defective sector re-allocation processing executed in a data storage device. First of all, for easier understanding of the present invention, a configuration of a hard disk drive (HDD), which is an example of data storage devices, will be schematically described as a whole.

Figure 1:
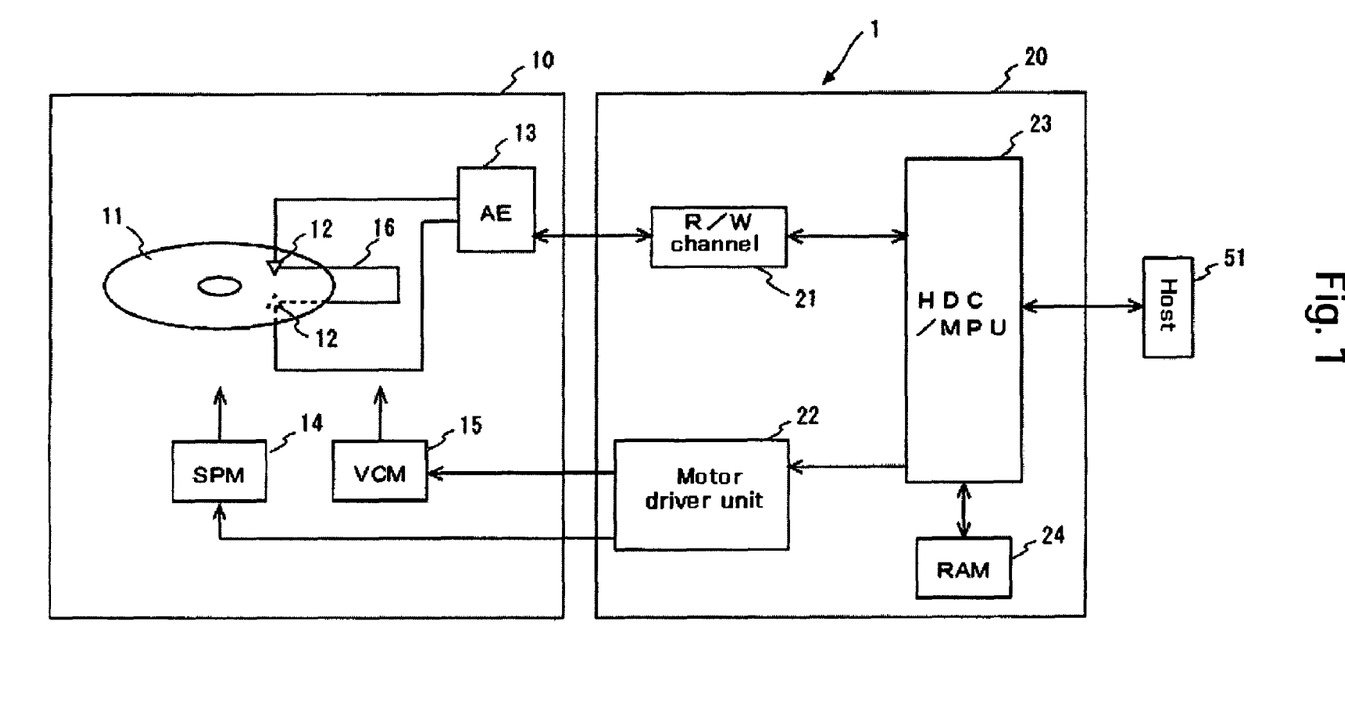
FIG. 1 is a block diagram schematically illustrating as a whole a configuration of a HDD according to an embodiment of the invention.

FIG. 1 is a block diagram schematically illustrating a configuration of a HDD 1 according to an embodiment. As shown in FIG. 1, the HDD 1 includes in a sealed enclosure 10: a magnetic disk 11 that is an example of a medium (recording medium); head elements 12; arm electronics (AE) 13; a spindle motor (SPM) 14; a voice coil motor (VCM) 15; and an actuator 16.

The HDD 1 further comprises a circuit board 20 secured outside the enclosure 10. On the circuit board 20, there are provided ICs including: a read/write channel (R/W channel) 21; a motor driver unit 22; an integrated circuit 23 including a hard disk controller (HDC) and an MPU (hereinafter referred to as HDC/MPU); and a RAM 24 which is an example of a memory. Incidentally, the above-mentioned circuits can be integrated into one IC; or each circuit can be implemented by dividing the circuit into a plurality of ICs.

Write data from an external host 51 is received by the HDC/MPU 23, and is sent through the R/W channel 21 and the AE 13. Then, the head element 12 writes the write data to the magnetic disk 11 which is a nonvolatile recording medium. On the other hand, read data stored on the magnetic disk 11 is read out by the head element 12. This read data is sent through the AE 13 and the R/W channel 21, and is then output from the HDC/MPU 23 to the external host 51.

Next, each component of the HDD 1 will be described. The magnetic disk 11 is secured to the SPM 14. The SPM 14 rotates the magnetic disk 11 at specified speed. The motor driver unit 22 drives the SPM 14 according to control data sent from the HDC/MPU 23. The magnetic disk 11 according to this embodiment has recording surfaces on both sides. Data is written to each of the recording surfaces. The head elements 12 are provided which are associated with the respective recording surfaces.

Each head element 12 is secured to a slider (not shown). The slider is secured to the actuator 16. The actuator 16 is connected to the VCM 15. The actuator 16 pivotally moves about a pivot shaft, which causes the head element 12 (and the slider) to move in the radial direction on the magnetic disk 11. The motor driver unit 22 drives the VCM 15 according to control data sent from the HDC/MPU 23.

The head element 12 typically includes: a write head for converting an electric signal into a magnetic field according to data to be written to the magnetic disk 11; and a read head for converting a magnetic field received from the magnetic disk 11 into an electric signal. It is to be noted that the required number of the magnetic disks 11 is one or more, and that a recording surface can be formed on one side, or both sides, of the magnetic disk 11.

The AE 13 selects from among the plurality of head elements 12 one head element 12 that is used to access data, and amplifies (preamplifies) at constant gain a read signal read by the selected head element 12, and then transmits the amplified signal to the R/W channel 21. In addition, the AE 13 sends a write signal received from the R/W channel 21, to the selected head element 12.

The R/W channel 21 performs write processing on data transmitted from the host 51. In the write processing, the R/W channel 21 performs code modulation on write data supplied from the HDC/MPU 23, and then converts the code-modulated write data into a write signal and supplies the write signal to the AE 13. Moreover, when data is supplied to the host 51, read processing is performed. In the read processing, the R/W channel 21 amplifies a read signal supplied from the AE 13 so that the amplitude is kept constant, and then extracts data from the obtained read signal to perform decode processing. Data that is read out includes user data and servo data. The decoded read data is supplied to the HDC/MPU 23.

In the HDC/MPU 23, the MPU operates according to microcodes loaded into the RAM 24. When the HDD 1 is started up, as control data, not only microcodes operating on the MPU but also data required for control and data processing are loaded into the RAM 24 from the magnetic disk 11 or a ROM (not shown). The HDC/MPU 23 executes code generation processing to perform error correction (ECC) on user data acquired from the host 51, and then transmits the user data to the R/W channel 21. Moreover, the HDC/MPU 23 executes error correction processing on read data read out from the magnetic disk 11, and then transmits the data to the host 51. Furthermore, the HDC/MPU 23 executes processing required for data processing such as management of command execution order, positioning control of the head elements 12, interface control, and defect control, and also executes the total control of the HDD 1.

On receipt of a read command from the host 51, the HDD 1 according to this embodiment executes processing of automatically replacing defective sectors in a read-command execution sequence. To be more specific, starting from the time when the HDD 1 receives the read command from the host 51 to the time when the HDD 1 notifies the host 51 of the completion of the read command, the HDD 1 detects defective sectors, and then executes the processing of replacing the defective sectors. By the completion of transmission of read data to the host 51, or by a command completion notification that is sent separately from the read data, the host 51 is notified of the completion of the command.

Defective sectors occur on the magnetic disk 11 include: a primary defective sector that is detected in a manufacturing stage; and a secondary defective sector that is generated after shipment. The recording surfaces of the magnetic disk 11 suffer degradation as a result of rewriting information and with the lapse of time. Accordingly, there is a possibility that the reliability of reading/writing data from/to a user sector will decrease. If it is judged that the reliability of a sector has become lower than or equal to a reference value, a reserved sector is used instead of using the sector in question. Data of a defective sector is typically written to a reserved sector located in a zone in which the defective sector exists. Thereafter, when the host 51 accesses the defective sector, the HDD 1 internally accesses the reserved sector corresponding to the defective sector.

In the read-command execution sequence, a defective sector whose reliability is lower than or equal to the reference value is selected from among data sectors that have been read out on the magnetic disk 11. Then, processing of replacing the defective sector with a reserved sector is performed. This makes it possible to disallow the use of the defective sector before the defective sector in question becomes a sector where data recovery cannot be achieved, and thereby to prevent required user data from being lost.

Here, after receiving the read command from the host 51, the HDD 1 is required to notify the host 51 of the command completion before a timeout period elapses. If the host 51 receives no reply from the HDD 1 before the timeout period elapses, the host 51 disconnects the HDD 1, and then reads data from another HDD. For this reason, before the timeout period elapses, it is necessary to transmit read data to the host 51, and also to complete the defective-sector re-allocation processing.

The re-allocation processing includes: accessing a reserved sector; writing data to the reserved sector; and making a check whether or not the data has been successfully written. Accordingly, a sufficient length of time is required to complete the re-allocation processing. Therefore, it is not always possible to complete the re-allocation processing for all defective sectors within the timeout period. In this embodiment, after determination of the reliability of each of data sectors that have been read out from the magnetic disk 11 in response to the read command, the re-allocation processing for the data sectors is performed in the order of increasing reliability. As a result, within a limited period of time, it is possible to replace by priority a data sector where there is a high possibility that data recovery will be unable to be achieved. This makes it possible to increase the security of data and the reliability of the HDD 1.

It is desirable that the reliability of a data sector be determined on the basis of the amount of ECC correction data (the number of corrected bytes). Data that is written to data sectors on the magnetic disk 11 includes user data transmitted from the host 51, and codes used for error correction. The codes used for error correction includes an ECC code and a CRCC (Cyclic Redundancy Check Code). The CRCC is used to check the error correction so as to prevent improper detection from occurring. This is because there is a very small probability that the ECC code will cause the improper detection. The Reed-Solomon code is typically used to generate the ECC and the CRCC.

As described above, the HDC/MPU 23 executes the error correction processing on the data read out from the magnetic disk 11. At this time, by use of the number of corrected bytes using ECC, the reliability of a data sector is determined. To be more specific, if the number of corrected bytes exceeds a reference value, the data sector in question is judged to be a defective sector that needs to be replaced. On the other hand, if the number of corrected bytes is smaller than or equal to the reference value, the data sector in question is judged to be a sector that does not need to be replaced. A specific value of the reference value is properly provided in accordance with the design of each HDD. The HDC/MPU 23 judges that with the increase in the number of corrected bytes, the reliability decreases. Accordingly, the HDC/MPU 23 executes data re-allocation processing in the order of the decreasing number of corrected bytes.

Figure 2:
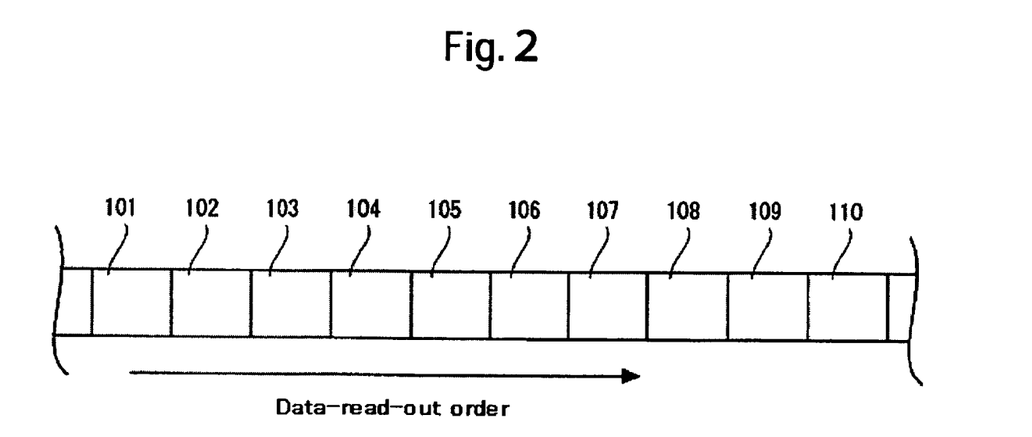
FIG. 2 is a diagram illustrating data sector read out in automatic re-allocation processing according to an embodiment of the invention.

Automatic defective-sector re-allocation processing according to this embodiment will be described with reference to a specific example. FIG. 2 is a diagram illustrating part of a track on the magnetic disk 11. FIG. 2 illustrates a plurality of data sectors, which are numbered from sector No. 101 to sector No. 110. In response to a read command received from the host 51, the HDD 1 reads out data from all of the data sectors 101 through 110. The order in which data is read out follows a direction from the data sector 101 to the data sector 110. In this example, an address range (LBA: Logical Block Address) specified by the read command corresponds to the data sectors 101 through 110. Incidentally, when a cache hit occurs, data is not read out from the magnetic disk 11. Therefore, the data in question is excluded.

Figure 3:
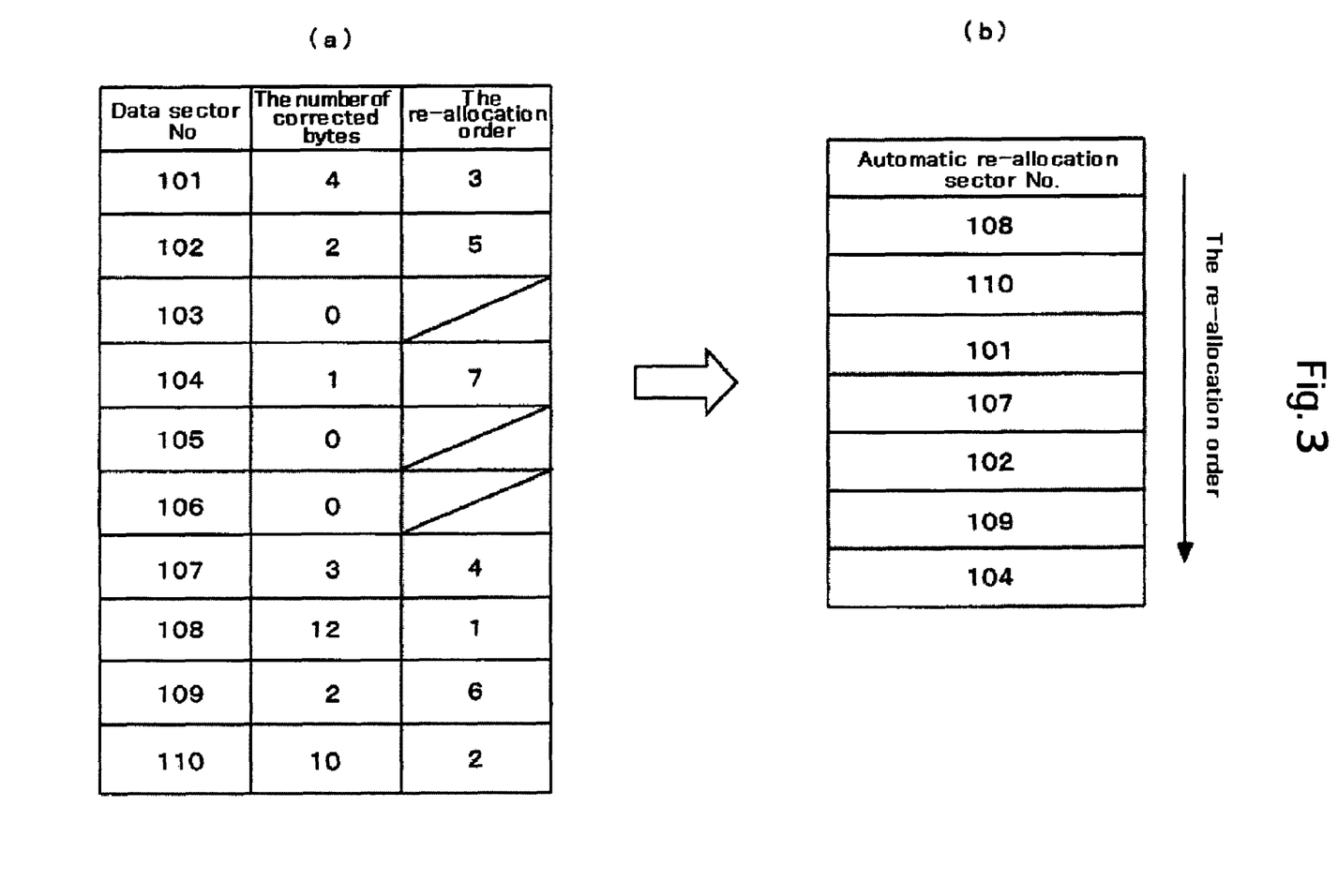
FIG. 3 illustrates as an example an automatic re-allocation table generated in automatic re-allocation processing according to an embodiment of the invention.

The HDC/MPU 23 successively reads out data from the data sectors 101 through 110 on the magnetic disk 11, and executes correction processing on the data read out from each data sector, and then stores the data in a read buffer included in the RAM 24. Moreover, the HDC/MPU 23 stores, in an automatic re-allocation table, data relating to the result of the correction processing performed on each sector. FIG. 3(*a*) is a diagram illustrating an example of the automatic re-allocation table. The automatic re-allocation table stores, for each data sector, the number of corrected bytes, and the re-allocation order that has been determined in response to the number of corrected bytes. With the increase in the number of corrected bytes, the defective sector in question is replaced earlier (the re-allocation processing is executed earlier). In this example, for the sake of simplification, even if the number of bytes whose error is corrected is one, the data sector in question is judged to be a target of the re-allocation processing (i.e., a defective sector). Incidentally, as described above, more typically, if the number of corrected bytes is larger than a predetermined reference value, the data sector in question is identified as a defective sector.

In FIG. 3(*a*), for example, the number of corrected bytes of the data sector 101 is four. Accordingly, the execution order is set at the third. The number of corrected bytes of the data sector 108 is 12. Because the data sector 108 has the largest number of corrected bytes among the data sectors 101 through 110 that have been read out, the execution order is set at the first. For the data sectors 103, 105, 106, because the number of corrected bytes is 0, the data sectors 103, 105, 106 are judged to be non-defective sectors (normal sectors). Accordingly, the re-allocation order is not set. The order in which the re-allocation processing is performed according to this table is shown in FIG. 3(*b*).

The HDC/MPU 23 executes the defect-sector re-allocation processing according to the order that has been determined. After the HDC/MPU 23 executes the re-allocation processing in which the number of replaced sectors is equivalent to the number of sectors that can be replaced within the timeout period, the HDC/MPU 23 starts transmission of data stored in the read buffer to the host 51. The timeout period is a period of time that can be spent before the host 51 is informed of the completion of the command. Therefore, the HDC/MPU 23 ends the automatic re-allocation processing with the data transmission time required to transmit data to the host 51 being allowed.

Figure 4:
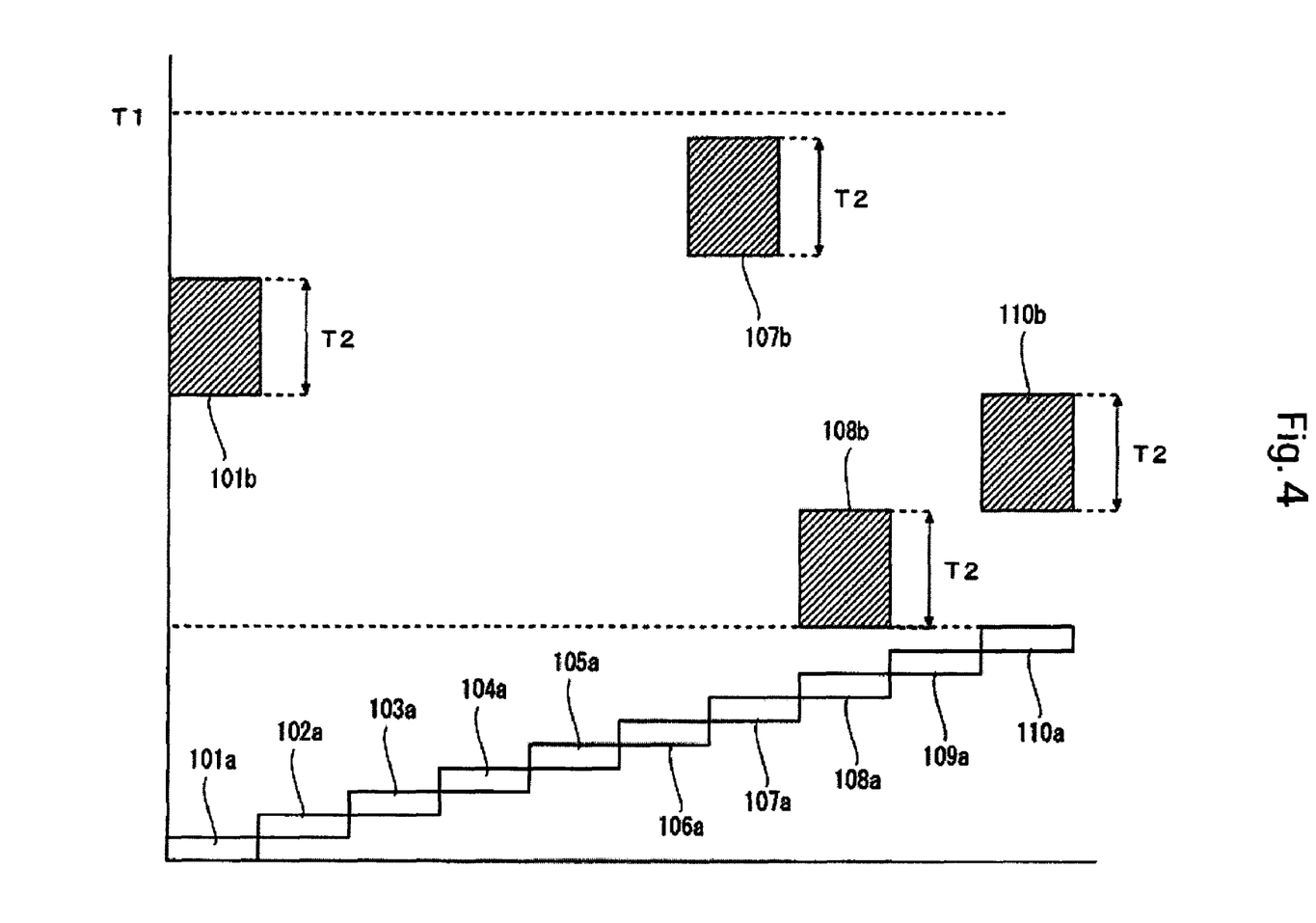
FIG. 4 is a diagram illustrating read processing and automatic re-allocation processing that are performed in a read-command execution sequence according to an embodiment of the invention.

FIG. 4 is a graph illustrating the relationship between each processing step in an execution sequence of a read command and time. In FIG. 4, the horizontal axis corresponds to data sectors, whereas the vertical axis corresponds to time. White boxes 101a through 110a represent data read processing of reading data from each data sector on the magnetic disk 11. On the other hand, hatched boxes 101b, 107b, 108b, 110b represent defective sector re-allocation processing. FIG. 4 corresponds to the automatic re-allocation table shown in FIG. 3(a).

First of all, the HDC/MPU 23 reads out data from all data sectors specified by a read command (101a through 110a). Then, the HDC/MPU 23 executes automatic re-allocation processing on defective sectors on the basis of the execution order stored in the automatic re-allocation table. First of all, the HDC/MPU 23 executes the automatic re-allocation processing 108b on the data sector 108. Next, the HDC/MPU 23 executes the automatic re-allocation processing 110b on the data sector 110, and then executes the automatic re-allocation processing 101b on the data sector 101, and lastly executes the automatic re-allocation processing 107b on the data sector 107. The end time T1 of the automatic re-allocation processing approaches in this timing, and therefore the remaining time is not enough to execute the automatic re-allocation processing for the next data sector 102. Accordingly, the HDC/MPU 23 ends the automatic re-allocation processing.

After reading out data from all data sectors specified by the read command, the HDD 1 determines the reliability of each data sector, and then executes the re-allocation processing on the data sectors in the order of increasing reliability. As a result, it is possible to replace by priority a data sector where there is a high possibility that data recovery will be unable to be achieved. In addition, by using the number of corrected bytes as a criterion for determining the reliability of a data sector, it is possible to determine the reliability accurately and quickly.

Figure 5:
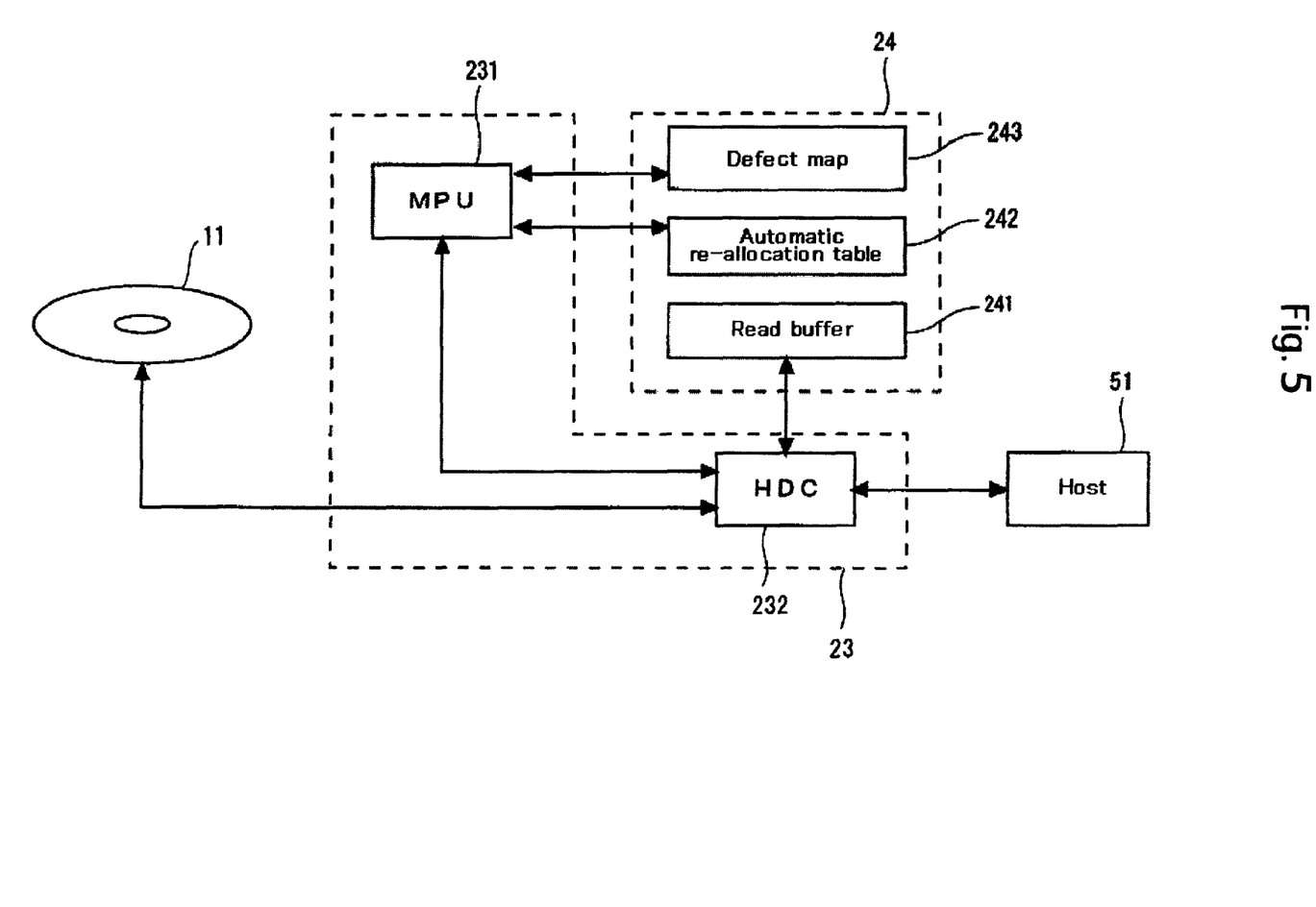
FIG. 5 is a block diagram schematically and partially illustrating a partial configuration of the HDD according to an embodiment of the invention, relating to automatic re-allocation processing.

Subsequently, an execution sequence of a read command including the automatic re-allocation processing according to this embodiment will be described in detail with reference to FIGS. 5 through 7. The HDC/MPU 23 executes the main processing of this sequence. The processing will be described in detail below. FIG. 5 is a block diagram partially illustrating a configuration of the HDD 1 relating to the automatic re-allocation processing. In FIG. 5, the R/W channel 21 and the AE 13 are omitted. As soon as the HDD 1 is powered on, the host 51 sets a timeout period in the HDD 1 as a mode parameter. In initialization processing at the time of power-on, judging from the timeout period set by the host 51, an MPU 231 determines the time at which the automatic re-allocation processing should be ended. Additionally, the HDD 1 has in advance the re-allocation processing time that is expected to be taken when re-allocation processing is executed once (one data sector). This time is set at an appropriate value according to the design.

Figure 6:
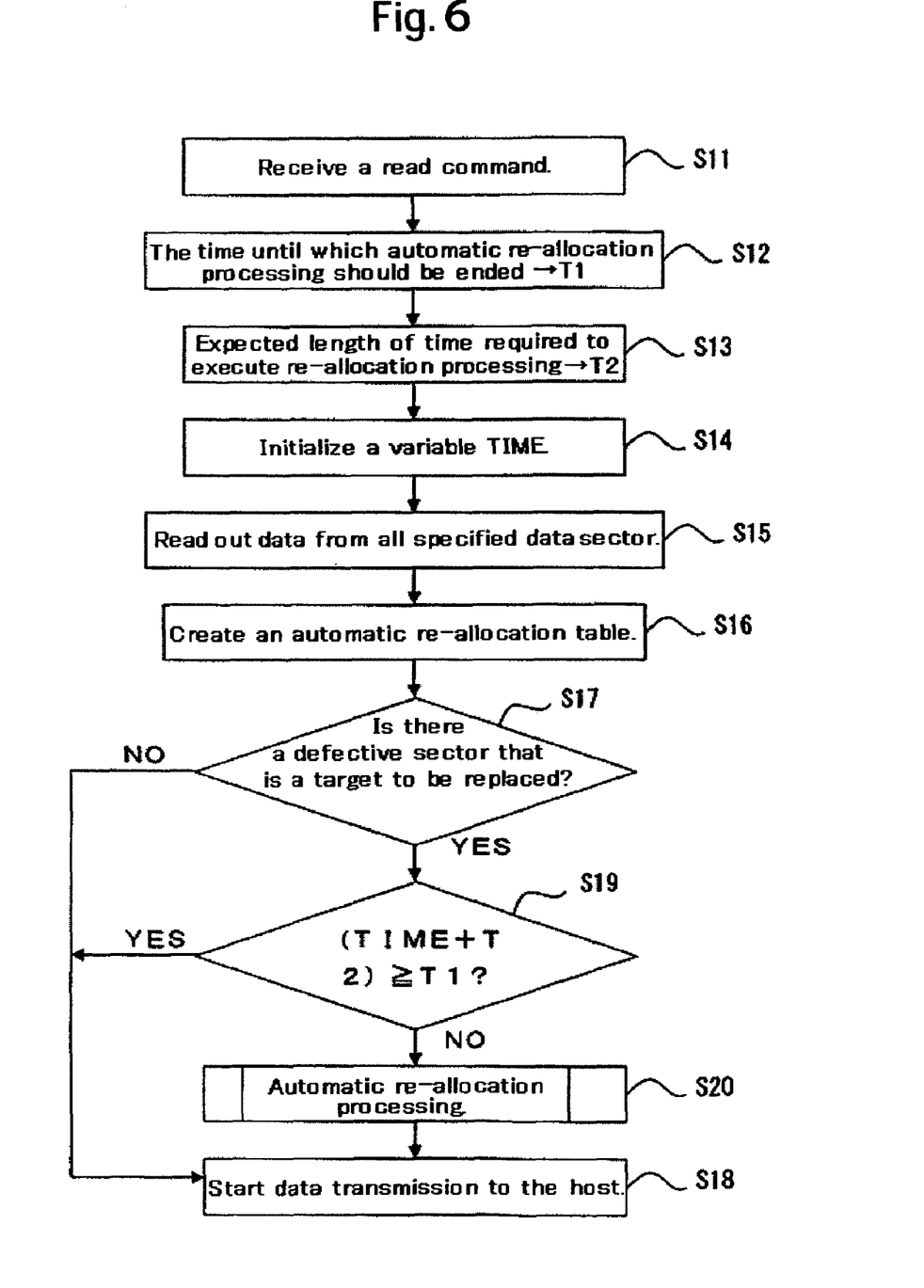
FIG. 6 is a process flowchart illustrating a read-command execution sequence according to an embodiment of the invention.
Figure 7:
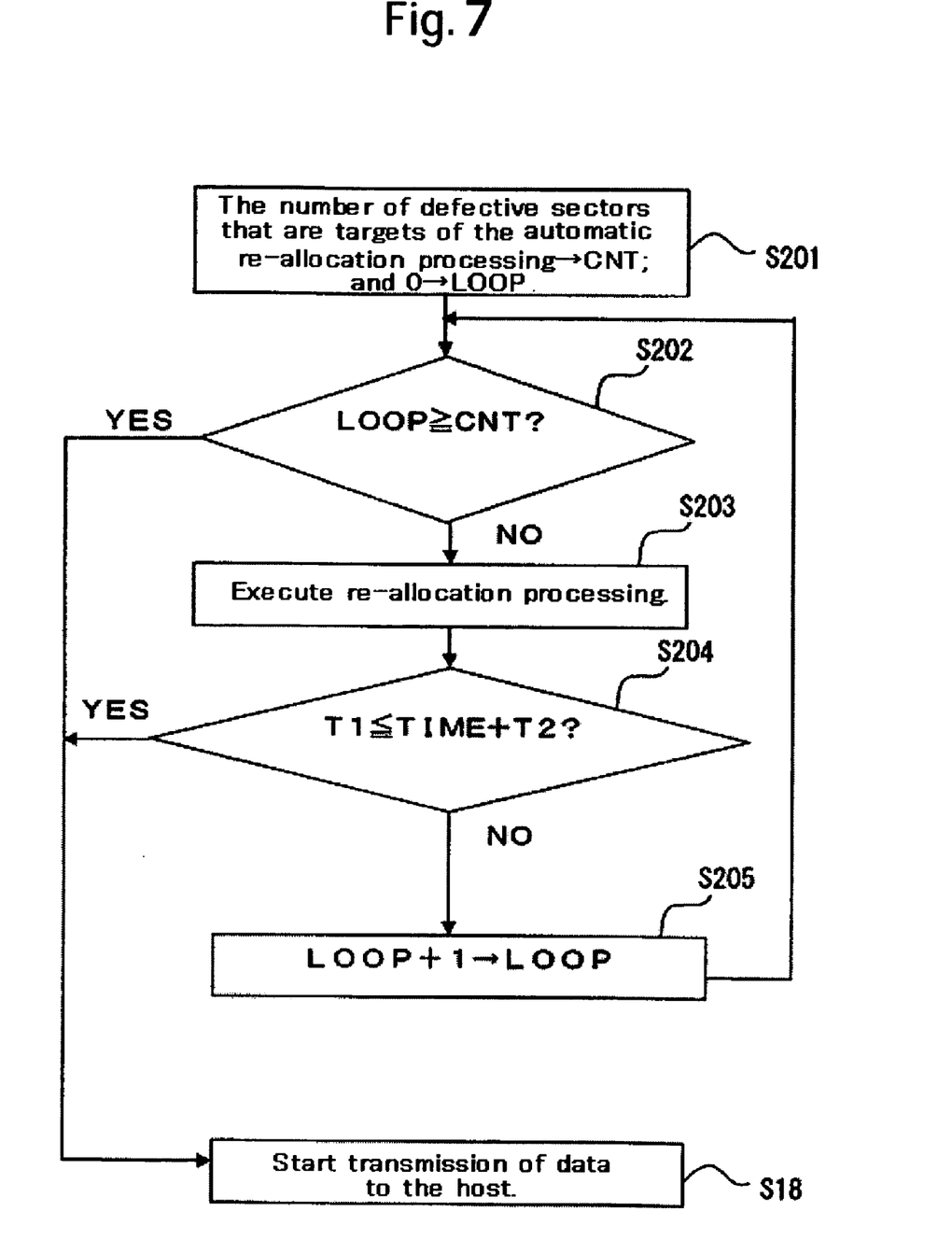
FIG. 7 is a process flowchart illustrating automatic re-allocation processing according to an embodiment of the invention.

With reference to FIGS. 5 and 6, the host 51 issues a read command to the HDD 1 with an address of read data being specified. Then, through an HDC 232, the MPU 231 receives the read command issued from the host 51 (S11). In response to the receipt of the read command, the MPU 231 sets a variable T1, which represents the time at which the automatic re-allocation processing should be ended (S12), and also sets a variable T2, which represents an expected length of time required to execute the re-allocation processing once (S13). In addition, the MPU 231 initializes a variable TIME (S14). The variable TIME is set at a specified value. In another case, the variable TIME is set at a value that changes in response to the number of data sectors specified by the read command. The MPU 231 functions as a read control part, and instructs the HDC 232 to read data from data sectors corresponding to the read command. According to the instruction from the MPU 231, the HDC 232 reads out data from all specified data sectors on the magnetic disk 11 (S15).

In the read processing (S15), the HDC 232 uses ECC to execute error-correction processing on data read out from each data sector, and then stores the data in a read buffer 241 included in the RAM 24. To be more specific, the HDC 232 judges whether or not an error is included in the data that has been read out. If it is judged that an error is included, the HDC 232 calculates error data including error positions and an error pattern, and then checks by use of CRCC whether or not the calculated error data is totally correct. Moreover, the HDC 232 outputs the number of corrected bytes of each data sector to the MPU 231.

With reference to the number of corrected bytes acquired from the HDC 232, the MPU 231 creates an automatic re-allocation table 242 (refer to FIG. 3(a)), that is, registers data in the automatic re-allocation table 242 (S16). Incidentally, for the purpose of high-speed processing, it is desirable to use hardware included in the HDC 232 to perform the error-correction processing. However, it is also possible to perform the error-correction processing using microcodes that are executed on the MPU 231.

The MPU 231 functions as a re-allocation-processing order determination part for determining the re-allocation order. The MPU 231 judges whether or not there is a defective sector that is a target to be replaced (S17). If it is judged that there is no defective sector, the MPU 231 starts data transmission to the host 51 without executing the automatic re-allocation processing (S18). If it is judged that there is a defective sector, the MPU 231 adds the expected length of time T2 required for re-allocation processing to the variable TIME (TIME+T2), and then compares the result of the addition with the end time T1 of the automatic re-allocation processing (S19). (TIME+T2) represents the elapsed time at the point of time when the re-allocation processing on the next data sector is completed. If (TIME+T2) is longer than or equal to T1, the MPU 231 starts data transmission to the host 51 (S18).

If (TIME+T2) is shorter than T1, the MPU 231 starts the automatic re-allocation processing (S20). The MPU 231 functions as a re-allocation-processing control part. With reference to FIGS. 5 and 7, in the automatic re-allocation processing, first of all, the MPU 231 sets a variable CNT at the number of data sectors that have been judged to be defective sectors, which are targets of the automatic re-allocation processing, and also sets a variable LOOP at 0 (S201). The variable LOOP is equivalent to the number of data sectors on which the re-allocation processing has been executed. Next, the variable LOOP is compared with the variable CNT (S202). Because a value of the variable LOOP is small before the execution of the first re-allocation processing (N in S202), the MPU 231 executes the re-allocation processing for a data sector whose number of corrected bytes is the largest (S203).

In the re-allocation processing (S203), data of a defective sector stored in the read buffer 241 is written to a reserved sector on the magnetic disk 11. Reserved sectors are managed by use of a defect map 243 stored in the RAM 24. On completion of the re-allocation processing for each data sector, the MPU 231 updates the defect map 243 to keep latest information thereof. The information registered in the defect map 243 includes: data for identifying a defective sector; and data for identifying a reserved sector corresponding to the defective sector.

For example, an address (LBA) of the defective sector, and an address of the reserved sector (CHS: Cylinder number, Head number, Sector number), are registered. When the HDC/MPU 23 receives from the host 51 an access request for an appropriate LBA, the HDC/MPU 23 refers to the defect map 243 to access a reserved sector corresponding to the LBA. Incidentally, the above processing using the defect map is a broadly known technique, and accordingly the detailed description thereof will be omitted in this specification.

On completion of the re-allocation processing on the data sector whose number of corrected bytes is the largest, the MPU 231 adds T2 to a current value of the TIME variable, and then compares the TIME variable plus T2 with T1 (S204). Here, (TIME+T2) represents the elapsed time at the point of time when the re-allocation processing on the next data sector is completed. If (TIME+T2) is smaller than T1, the MPU 231 ends the automatic re-allocation processing, and then starts transmission of user data stored in the read buffer 241 to the host 51 (S18). To be more specific, the MPU 231 instructs the HDC 232 to start the transmission of the data, and then the HDC 232 transmits the user data from the read buffer to the host 51. On completion of the data transmission to the host 51, if necessary, the MPU 231 transmits a command completion notification separately from the transmitted user data.

If (TIME+T2) is larger than or equal to T1 (TIME+T2≧T1), the MPU 231 adds one to the current value of the variable LOOP (S205), and then returns to S202 where the variable LOOP is compared with the variable CNT. If an unreplaced defective sector does not exist, a value of the variable LOOP becomes larger than or equal to that of the variable CNT (LOOP≧CNT). As a result, the MPU 231 ends the automatic re-allocation processing. On the other hand, if an unreplaced defective sector exists, a value of the variable LOOP becomes smaller than that of the variable CNT (LOOP<CNT). The MPU 231 starts the re-allocation processing on a data sector whose number of corrected bytes is the largest among unreplaced defective sectors (S203). Thereafter, the MPU 231 repeats each of the above-mentioned steps, with the result that the execution sequence of the read command is completed.

Another Embodiment

Some variations of the above-mentioned embodiment will be described below. In the embodiment described above, defective sectors to be replaced and the re-allocation order thereof are determined on the basis of the number of corrected bytes. Besides the above method, it is possible to determine the reliability of a data sector on the basis of retry processing in error recovery procedures. If a failure occurs in which data cannot be read out from the magnetic disk 11 in a usual read mode, the HDD 1 starts the recovery procedures. The HDD 1 repeatedly tries to read data (retry step) by changing read parameters. Example of changing read parameters include: changing the read timing; fine adjusting a radial position of the head element 12; changing a sense current of a MR head in the head element 12; changing a VGA (Variable Gain Amplifier) gain value in the R/W channel 21; and changing a digital filter parameter value.

The HDD 1 reads out data from data sectors corresponding to a read command received from the host 51 (S15 in FIG. 6). At this time, if the HDD 1 cannot correctly read out data from a data sector in a first reading step, the MPU 231 starts the recovery procedures. The MPU 231 instructs each part in the HDD 1 to change values of the read parameters, and thereby executes a retry step using the read parameters with different values. If the data could be correctly read out as a result of changing the values of the read parameters, the MPU 231 registers, in the automatic re-allocation table 242, a kind of the retry step, and the number of times the retry step has been executed to correctly read out the data (the depth of retry). For each data sector that has been read out, the MPU 231 registers the above data.

For example, if the number of times the retry step has been executed to read data is larger than or equal to a reference value, the MPU 231 judges that the reliability of the sector is low, and accordingly identifies the sector in question as a defective sector. In addition, the MPU 231 determines the re-allocation order in the automatic re-allocation processing on the basis of the number of times the retry step has been executed. For example, the automatic re-allocation processing is executed in the order of the decreasing number of times the retry step has been executed. When a defective sector is identified and the re-allocation order is determined, it is desirable to refer to the kind and contents of the retry step in which data has been successfully read out. For example, if data could be read out as a result of changing a radius position of the head element 12, the data sector in question is identified as a non-defective sector. Moreover, it is also possible to use in combination the retry steps, and the number of bytes whose error has been corrected by use of ECC.

In the above example, the HDD 1 reads out, from the magnetic disk 11, only data existing within an address range specified by the host 51. The following is known in the art. That is to say, depending on a kind of the HDD, in addition to data existing within a range specified by the read command, data written at an address before the specified range is read out (read back), or data written at an address after the specified range is read out (read forward). Because the host 51 often requests the HDD to read these data in succession, reading out beforehand the data from the magnetic disk 11 makes it possible to increase a cache hit ratio, and thereby to improve the performance.

The HDD 1 can also include, in the above automatic re-allocation processing, data sectors read out as a result of the read forward and the read back. In other words, the MPU 231 compares the number of corrected bytes of all data sectors corresponding to the read command, all the data sectors including the data sectors read out as a result of the read forward and the read back. Then, the MPU 231 successively executes the re-allocation processing on the data sectors in the order of the decreasing number of corrected bytes. In another case, the HDD 1 can also execute the automatic re-allocation processing on only data sectors existing within the range specified by the read command, while not executing it on the data sectors read out as a result of the read forward and the read back.

Moreover, in the above example, the HDD 1 determines the re-allocation order of each data sector after reading out data from all data sectors specified by the host 51. In order to execute by priority the re-allocation processing on a data sector where there is a high possibility that data recovery will not be able to be achieved, it is desirable to determine the re-allocation order after reading out all data corresponding to the read command. However, the HDD 1 can determine the re-allocation order in a stage in which data is read out from part of a plurality of data sectors corresponding to the read command.

For example, in the timing in which data is read out from data sectors whose range corresponds to one track, the MPU 231 judges whether or not each of the data sectors is a defective sector, and then determines the re-allocation order of the defective sectors. Moreover, the MPU 231 executes the defect-sector re-allocation processing according to the order that has been determined. On completion of the automatic re-allocation processing, the HDD 1 transmits to the host 51 user data stored in the read buffer 241. Subsequently, the HDD 1 newly reads out data from data sectors whose range corresponds to another track, and then repeatedly performs the above processing in a similar manner.

Thus, every time data is read out from part of a plurality of data sectors corresponding to a read command, the re-allocation order of defective sectors is determined, and the re-allocation processing on the defective sectors is executed. This method is effective in a case where, for example, the capacity of a read buffer is not sufficient for user data to be read out from the magnetic disk 11. By executing the re-allocation processing before data of a defective sector stored in the read buffer 241 is overwritten and erased by data that is newly read out from the magnetic disk, it is possible to omit processing of newly reading out data for the re-allocation processing, and to avoid the possibility of being unable to newly read out data from the defective sector.

From another point of view, if the capacity of the read buffer is small, storing data of a defective sector in another area included in the RAM 24 is one of the other preferable methods. More specifically, the MPU 231 reads out data from data sectors whose range corresponds to, e.g., one track. Then, on the basis of the number of corrected bytes, the MPU 231 makes a judgment as to whether or not each of the data sectors is a defective sector. The MPU 231 also stores user data of a data sector that has been judged to be a defective sector, in an area that differs from the read buffer 241. Moreover, the MPU 231 registers the number of corrected bytes of each data sector in the automatic re-allocation table.

In this timing, without executing the re-allocation processing on the defective sectors, the MPU 231 transmits to the host 51 user data stored in the read buffer 241. Subsequently, on the magnetic disk 11, the MPU 231 newly reads out user data from data sectors whose range corresponds to one track, and repeatedly performs the above processing in a similar manner. After reading out all data from the magnetic disk 11, the MPU 231 determines the order in which the re-allocation processing is executed for all defective sectors. Moreover, the MPU 231 uses user data stored in the RAM 24 to execute the re-allocation processing on each defective sector according to the determined order. As a result, if the capacity of the read buffer is small, it is possible to execute the re-allocation processing starting from a data sector whose reliability is the lowest among the data sectors that have been read out. This makes it possible to increase the security of data.

In the above example, after the automatic re-allocation processing ends, the HDD 1 transmits to the host 51 the user data that has been read out (S18 in FIG. 6). Instead of the above, the data transmission to the host 51 can be performed in parallel with the automatic re-allocation processing, or in parallel with read processing of reading from the magnetic disk 11. This makes it possible to use the data transmission time, which is required to transmit data to the host 51, for the automatic re-allocation processing. In this case, in order to have the time required to execute the automatic re-allocation processing, transmission of a command completion notification is delayed after the data transmission to the host 51 is completed so as to prevent the host 51 from issuing a new command. In another case, if the completion of data transmission is equivalent to a command completion notification, the last data transmission is delayed.

In the above example, the MPU 231 determines the end timing of the automatic re-allocation processing by use of the expected length of time for re-allocation processing T2 as a specified value, and the number of times the re-allocation processing is performed (the number of replaced sectors). The MPU 231 can also determine the end timing of the automatic re-allocation processing by use of the time that has been actually measured using the timer.

Incidentally, the above describes how the present invention is applicable, and is not intended to limit the scope of the present invention to the embodiments cited above. Those skilled in the art will be able to easily make modifications, additions and alterations to each element of the above embodiments within the scope of the preset invention. For example, the automatic re-allocation processing according to the above embodiments can be applied to data storage devices that use media other than magnetic disks.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A data storage device comprising:
   a read control part which performs control to receive a read command, and read out data from a plurality of sectors on a medium corresponding to the read command;
   a re-allocation-processing order determination part which determines an order in which re-allocation processing is executed for defective sectors included in the plurality of sectors whose data has been read out; and
   a re-allocation-processing control part which controls the re-allocation processing for the defective sectors on the basis of the re-allocation-processing order determined by the re-allocation-processing order determination part,
   wherein:
   said re-allocation-processing order determination part determines the re-allocation-processing order on the basis of an amount of error correction achieved when data has been read out from each sector.

2. A data storage device according to claim 1, wherein:
   said re-allocation-processing order determination part determines the re-allocation-processing order so that the re-allocation processing is executed in the order of the decreasing amount of error correction achieved when data has been read out from each sector.

3. A data storage device according to claim 1, wherein:
   said read control part reads out read data from all specified sectors on the medium, said all sectors being specified by the read command; and
   said re-allocation-processing order determination part determines the order in which the re-allocation processing is executed on defective sectors included in said all sectors.

4. A data storage device according to claim 1, wherein:
   said read control part reads out read data from all corresponding sectors on the medium, said all sectors corresponding to the read command; and
   said re-allocation-processing order determination part determines the order in which the re-allocation processing is executed on defective sectors included in said all sectors.

5. A data storage device according to claim 4, wherein:
   data that should be read out from said all sectors on the medium corresponding to the read command includes data at positions before and/or after the sectors specified by the read command.

6. A data storage device according to claim 1, wherein said re-allocation-processing order determination part determines the re-allocation-processing order in a stage in which data is read out from part of a plurality of data sectors corresponding to the read command.

7. A data storage device according to claim 6, wherein said re-allocation-processing order determination part repeatedly determines the re-allocation-processing order until all data corresponding to the read command is read out so as to determine the order for all defective sectors.

8. A data storage device according to claim 1, wherein:
the re-allocation-processing order is such that the re-allocation processing is performed starting from a sector whose reliability is low.

9. A data storage device according to claim 1, further comprising:
a correction processing part which performs error-correction processing on data read out from the medium;
wherein said re-allocation-processing order determination part determines the re-allocation-processing order of defective sectors by use of the amount of correction made for each sector whose data has been read out.

10. A method of sector re-allocation processing according to claim 9, wherein:
said re-allocation-processing order determination part sets a sector having a largest amount of correction as the first in the re-allocation-processing order.

11. A data storage device according to claim 1, wherein:
said read control part performs control to read out read data that is specified by said read command to be read out from all specified sectors on the medium; and
on the basis of an amount of error correction achieved when data has been read out from each sector, said re-allocation-processing order determination part determines the re-allocation-processing order of defective sectors included in all of sectors whose data has been read out.

12. A data storage device according to claim 1, wherein said re-allocation-processing order determination determines the re-allocation-processing order on the basis of both an amount of error correction achieved when data has been read out from each sector and retry processing performed when data has been read out from each sector.

13. A data storage device comprising:
a read control part which performs control to receive a read command, and read out data from a plurality of sectors on a medium corresponding to the read command;
a re-allocation-processing order determination part which determines an order in which re-allocation processing is executed for defective sectors included in the plurality of sectors whose data has been read out; and
a re-allocation-processing control part which controls the re-allocation processing for the defective sectors on the basis of the re-allocation-processing order determined by the re-allocation-processing order determination part,
wherein:
the end timing of the re-allocation processing for a plurality of defective sectors is determined so that a command completion notification of the read command is transmitted before a timeout period of the read command elapses.

14. A data storage device according to claim 13, wherein:
said end timing is determined by use of a predetermined value and the number of times the re-allocation processing for the defective sectors is executed.

15. A data storage device comprising:
a read control part which performs control to receive a read command, and read out data from a plurality of sectors on a medium corresponding to the read command;
a re-allocation-processing order determination part which determines an order in which re-allocation processing is executed for defective sectors included in the plurality of sectors whose data has been read out; and
a re-allocation-processing control part which controls the re-allocation processing for the defective sectors on the basis of the re-allocation-processing order determined by the re-allocation-processing order determination part,
wherein:
said re-allocation-processing order determination part determines the re-allocation-processing order on the basis of retry processing performed when data has been read out from each sector.

16. A data storage device according to claim 15, wherein said retry processing is performed by changing one or more read parameters.

17. A data storage device according to claim 16, wherein said one or more read parameters include read timing, redial position of a head element, sense current of a magnetoresistive head in the head element, variable gain amplifier gain value in a read/write channel, and digital filter parameter value.

18. A data storage device according to claim 15, wherein a sector is defective if the number of times the retry processing is performed to correctly read out the data exceeds a reference value.

19. A data storage device according to claim 15, wherein said re-allocation-processing order determination determines the re-allocation-processing order on the basis of the number of times the retry processing is performed to correctly read out the data.

* * * * *

UNITED STATES PATENT AND TRADEMARK OFFICE
CERTIFICATE OF CORRECTION

PATENT NO. : 7,607,039 B2
APPLICATION NO. : 11/388948
DATED : October 20, 2009
INVENTOR(S) : Shikama et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 753 days.

Signed and Sealed this

Twelfth Day of October, 2010

David J. Kappos
*Director of the United States Patent and Trademark Office*